Patented May 19, 1936

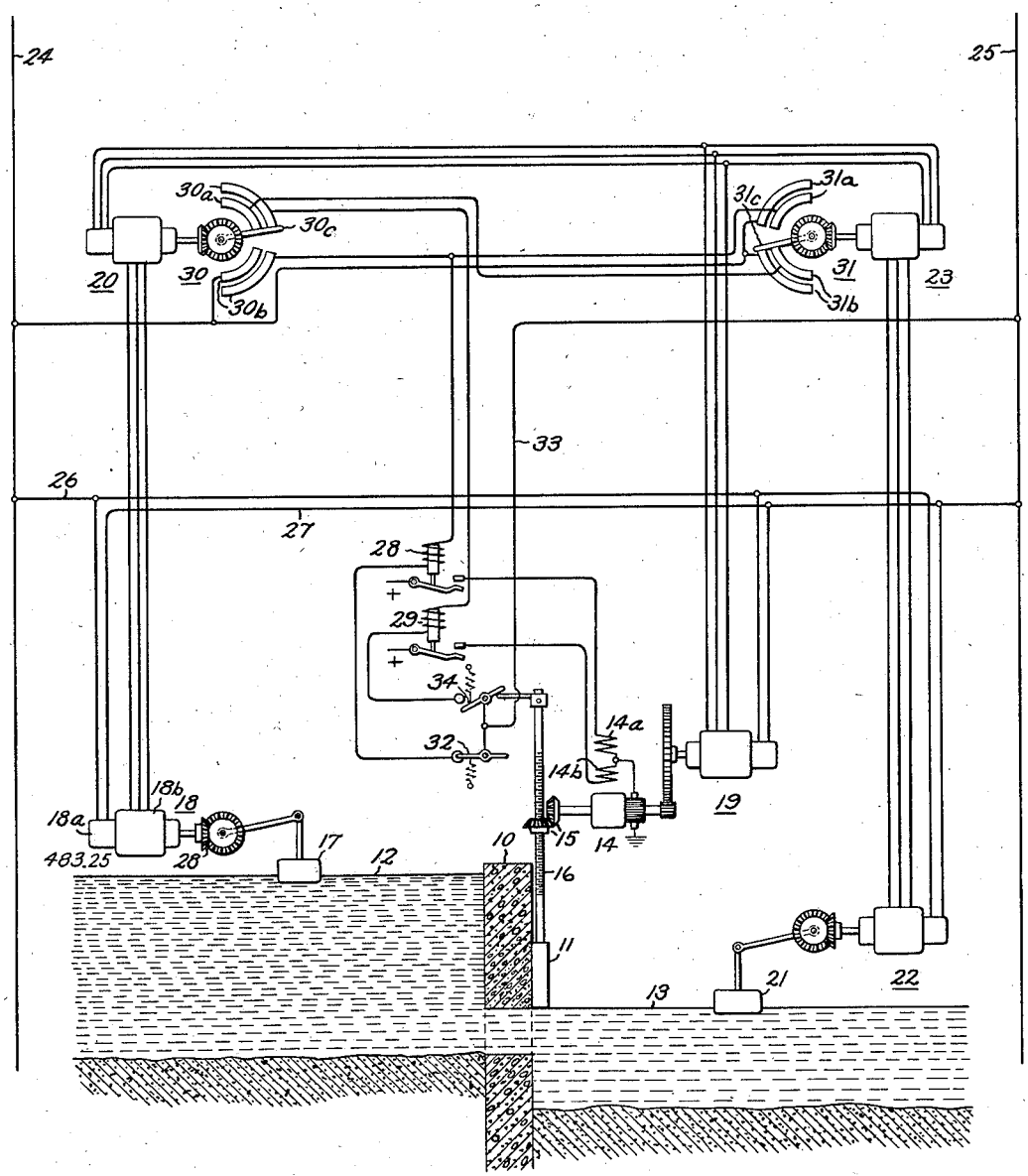

2,041,576

UNITED STATES PATENT OFFICE 2,041,576

CONTROL SYSTEM

Alfred Suksdorf, Schenectady, N. Y., assignor to General Electric Company, a corporation of New York Application August 6, 1935, Serial No. 34,859

6 Claims. (Cl. 61—28)

This invention relates to control systems, more particularly to systems for controlling and maintaining desired levels for fluid bodies, such as the bodies of water on opposite sides of a dam, and it has for an object the provision of a simple, reliable, efficient and improved system of this character.

More specifically, the invention relates to a control system for fluid bodies in which valve means are provided for controlling the communication between fluid bodies so as to control the levels thereof, and a specific object is the provision of means for controlling the valve opening means in accordance with the fluid body levels on opposite sides of the valve and for limiting the valve opening produced in response to a change in level of each body to the amount called for by the level of the other body, or permitting the valve to be closed to any degree in response to the change in level of either body. Stated in other words, the object is the provision of means requiring joint action of the means responsive to changes in level of the different bodies to open the valve while permitting individual action of these means to close the valves.

In carrying the invention into effect in one form thereof, valve means are provided between fluid bodies of different levels, and means controlled by the level of each body are provided for controlling the valve opening, together with interlocking means controlled jointly by the level responsive means for limiting the valve opening produced by the level responsive means of either body, to the maximum opening determined by the level of the other body, so that the level controlled means calling for the smaller valve opening has priority of control.

In illustrating the invention in one form thereof, it is shown as embodied in a control system for controlling the head gate between the pond or pool on the up-stream side of a dam and the raceways on the down-stream side supplying water to various industrial users.

For a better and more complete understanding of the invention, reference should now be had to the following specification and to the accompanying drawing, the single figure of which is a simple diagrammatical illustration of an embodiment of the invention.

Referring now to the drawing, a dam 10 is provided in a river for the purposes of providing a sufficient water depth for navigation. The dam is provided with valve means, illustrated as a head gate 11 for controlling the quantity of water allowed to flow from the pond 12 into a head race 13 by increasing or decreasing the opening of the gate. The quantity of water allowed to flow is to be determined primarily by the amount or height of water available in the pond, and secondarily by the amount or elevation of water required by the industrial plants and users along the raceways.

In the example taken for illustration, which is an actual example, the requirements for navigation are that normal pond or river level above the dam shall ordinarily be maintained at an elevation of 483.25 ft. or higher. In case there should be a further drop in the pond level below elevation 483.25 ft., in order not to cause a stop and complete shut-down of the industrial plants and public utility properties along the raceways using water power, a leeway of one-half foot is allowed, through which a gradual curtailment of the use of water is made by gradually restricting the opening in the head-gate. When the level of the pond above the dam reaches an elevation of 482.75 ft., i. e. one-half foot below the desired elevation, the head-gates at the entrance of the raceways are fully closed and no more water may be drawn from the pond until such time as the water level in the pond again rises above 482.75 ft.

The normal water level in the raceway 13 is 480 ft. If the water level rises above this height, there is a gradual curtailment of the flow of water through the head-gate by closing the head-gate a sufficient amount to accomplish this result. A lee-way of 1 ft. is allowed before a complete closing of the gate is required. The water level is never allowed to exceed a height of 1 ft. above the normal raceway level.

The raceway gate 11 is raised and lowered by a suitable driving means indicated as an electric motor 14 to the drive shaft of which, the gate is connected through suitable gearing 15 and a travelling screw 16. Although the motor 14 may be of any suitable type it is illustrated as a direct current motor supplied from a suitable source and provided with reversely wound field windings 14a and 14b to provide for operation of the motor in opposite directions.

In order to control the opening of the gate 11, in accordance with the level of the pond 12, an electrical motion transmitting system is provided which is actuated by any suitable means responsive to changes in the level of the pond, such for example as the float 17. It will be understood of course that, if desired, a pressure responsive device may be utilized instead of the float. The motion transmission system comprises a transmitting device 18, actuated by the float 17, a transmitting device 19 connected to the motor 14 and an electrical differential motion receiving device 20.

A similar motion transmission system is provided for controlling the opening of the gate in accordance with the level of the raceway 13. This motion transmission system is illustrated as comprising a float 21 and an electrical motion transmission device 22 actuated thereby, an electrical differential motion receiving device 23 and the same electrical motion transmitting device 19 as that utilized for the pond level electrical motion transmission system.

The motion transmitting device 18 is mechanically, a miniature bipolar, rotating field, three-phase alternator. The rotor 18a is provided with a single-phase, concentrated winding (not shown); the stator member 18b is provided with a three-circuit, distributed, Y-connected winding. The rotor winding is supplied from a suitable source of single phase voltage represented by the two supply lines 24 and 25, to which the rotor winding is connected by means of conductors 26 and 27. Electrically, in normal operation, the transmitter acts as a transformer and voltages and current existing in the device are all single phase. By transformer action, voltages are induced in the three elements of the stator winding, and the magnitude of these voltages depend upon the angular position of the rotor. The rotor member of the transmitter 18 is mechanically connected to the float 17 through gearing 28, the ratio of which is so chosen as to provide a rotation of 180° of the rotor in response to a change in the water level of 6 in.

The transmitting device 19 is in all respects identical with the transmitting device 18; its rotor winding being supplied from the same single phase source 24, 25 through conductors 26 and 27. The rotor member is mechanically connected to the motor 14 through suitable reduction gearing, the ratio of which is so chosen as to provide a rotation of 180° of the rotor member when the gate 11 is moved through its entire range of movement.

The electrical differential motion receiving device 20 is similar in construction to the transmitting device, except that its rotor has a distributed, three-circuit, Y-connected winding. Thus, its physical form is seen to be that of a miniature, three-phase, wound rotor, induction motor. However, in normal operation, its function is that of a single phase transformer and three-phase voltages and current do not exist.

The stator winding of the differential device is connected phase for phase to the stator winding of the transmitter 18; and the rotor winding is connected phase for phase to the stator winding of the transmitting device 19 since the differential device does not have a connection directly to the source of supply, its exciting current must be furnished through one or both of the transmitting devices to which it is connected.

In operation, the differential device is very similar to that of an ordinary electrical motion receiving device. The voltage distribution in its stator winding is the same as in the stator winding of the transmitting device 18, and, therefore, the distribution of the flux in the stator winding is the same as in that of the transmitting device 18. Likewise, the impressed voltage distribution in its rotor winding is the same as in that of the stator winding of the transmitting device 19 to which it is connected. The induced rotor winding voltage distribution is, of course, determined by the distribution of the exciting flux. The point of equilibrium is such that the import and induced voltages in the rotor winding of the differential device are equal and opposite. Under this condition, there is a minimum current flow. Disturbance of this condition will set up a circulating current, which will react on the excitation flux, producing a torque tending to restore the equilibrium condition. A disturbance can be set by moving the rotor of any one of the three devices 18, 19 and 20. If the rotor member of any one of the three is fixed in position and the rotor member of the second one is displaced a certain angle, the rotor of the third, being free to rotate, will turn to the same angle. If the rotors of any two of the devices are rotated simultaneously, the rotor of the third device will rotate through an angle equal to the algebraic sum of the movement of the other two; the algebraic sign being dependent not only upon the physical direction of rotation of the rotors, but also upon the phase rotation of the windings. The connection of the stator and rotor windings of the differential device 20 with the startor windings of the transmitting devices 18 and 19 are so made that the rotation of the rotor of the differential device 20 is equal to the difference of the rotation of the rotors of the two transmitting devices 18 and 19.

The operation of the transmitting devices 19 and 22 and the differential device 23 is similar to that described for the devices 18, 19 and 20.

Suitable reversing switching means, illustrated as a pair of electromagnetic contactors 28, 29, are respectively included in the circuits of the field windings 14a, 14b of the motor 14. Energization and closing of one or the other of these contactors connects the motor armature to the supply source through one or the other of the field windings and thus determines the direction of rotation of the motor.

The energization of the contactors 28, 29 is controlled by suitable switching devices 30 and 31 respectively actuated by the differential devices 20 and 23. The device 30 is illustrated as comprising two pairs of stationary contacts 30a and 30b and a movable contact 30c connected through gearing to the shaft of the differential device 20. Similarly the device 31 is illustrated as comprising two pairs of stationary contacts 31a and 31b and a movable contact 31c connected through gearing to the rotor of the differential device 23. The pairs of stationary contacts of each of these devices are separated by a distance corresponding approximately to 6° of rotation of the rotor of the differential device. Thus, in the case of the pond motion transmission system the distance between the stationary contacts controlled by the differential device corresponds to a change in the water level of .2 in.

With the above understanding of the elements and apparatus and their organization in the completed system, the operation of the system itself will readily be understood from the following detailed description:

Although many combinations of water levels in the pond and raceway are possible, an explanation of the operation of the system under several typical operating conditions will serve to explain the operation of the system. Assume that the water level in the pond is at or above elevation 483.25 ft. and that the water level in the raceway 13 is at elevation 480 ft. Under these conditions, the gate 11 is opened. Let it further be assumed that the system is in equilibrium. Under these conditions, the floats 17 and 21 are in the positions illustrated and similarly the movable contacts of the differential devices 20 and 23 are in the positions illustrated.

If the level of the pond 12 decreases .2 in. the float 17 will rotate the rotor of the transmitter device 18 substantially 6° and since the rotor of the transmitting device 19 remains at rest, the rotor of the differential receiving device 20 rotates an amount corresponding to that of the transmitting device 18, thereby actuating the movable contact member 30c into engagement with the stationary contact 30b to complete an energizing circuit for the lowering contactor 28. This circuit is traced from the left-hand supply line 24, through the stationary contact 30b, operating coil of lowering contactor 28, lower limit switch 32 (in the closed position thereof) and conductor 33 to the opposite side of the supply source. Contactor 28 closes in response to energization and connects the motor 14 to its supply source over a circuit that is traced in the positive side of the source, through the contacts of contactor 28, field winding 14a and armature of motor 14 to the ground or negative side of the supply source. As a result, the motor 14 rotates the nut on the screw 16 in such a direction as to lower the gate 11. As the gate is lowered, the transmitting device 19 rotates and returns the rotor of the differential device 20 to its former position, thereby interrupting the circuit through the contact 30b, deenergizing the contactor 28 and opening the motor circuit. Thus, the motor is stopped after the gate 11 has been lowered an amount proportional to the fall in level of the pond 12.

The rotation of the transmitter 19 also causes the differential device 23 to rotate its movable contact 31c in a counter-clockwise direction. However, the energizing circuit for the raised contactor 29 remains open at the contact 30a so that no change in the water level of the raceway 13 can by itself complete the energizing circuit for the raised contactor until the water level in the pond has risen an amount sufficient to close the contact 30a. Thus, the differential 23 cannot raise the gate above the position determined by the float 17 and the transmitter 18.

If the water level in the pond rises to the previous elevation of 483.25 ft. the system is restored to the position shown in the drawing with the gate 11 open. If now for any reason, the level of the water in the raceway 13 begins to rise, the rotor member of the transmitting device 22 will rotate and cause the rotor member of the differential device 23 to rotate in a direction such as to actuate the movable contact member 31c into engagement with the stationary contact 31a thereby completing an energizing circuit for the operating coil of the lowering contactor causing the latter to close and connect the motor 14 to its supply source for rotation in a direction to lower the gate 11. After the gate 11 has been closed by an amount proportional to the rise in the water level of the raceway 13, the rotation of the transmitting device 19 will cause the rotor of the differential device 23 to rotate the movable contact 31c to a position mid-way between the pairs of stationary contacts thereby interrupting the energizing circuit for the lowering contactor, causing the latter to open the motor circuit and to stop the gate. Likewise, the rotation of the transmitting device 19 will cause the differential device 20 to rotate the movable contact member 30c in the counter-clockwise direction by an amount proportional to the rise in the water level in the raceway 13. That is to say, if the water level in the raceway 13 has risen to a point half-way between the limits of 480 ft. and 481 ft., the motor 14 will have operated the gate 11 to its half closed position and the rotation of the transmitting device 19 will have caused the differential device 20 to rotate the movable contact member 30c substantially 90° in a counter-clockwise direction from the position in which it is illustrated. Under this condition, it will be impossible for the differential device 20 to complete an energizing circuit for the operating coil of the raise contactor 29 in response to any rise in the water level of the pond because the series circuit for the operating coil of this contactor is open at the contact 31b and consequently the raised contactor 29 cannot be energized and the gate 11 opened unless the water level in the raceway 13 begins to fall.

Thus, it will be seen that neither the float 17 nor the float 21 can operate the motor to open the gate 11 more than the amount called for by either float. In other words, when the float 17 has caused the system to close the gate 11 a predetermined amount in response to fallen water level in the pond, the float 21 cannot open the gate more than the amount determined by the float 17. Likewise, when the float 21, in response to rising water level in the raceway 13, has caused the gate 11 to be closed a certain amount, the float 17 cannot control the system to open the gate more than the amount determined by the float 21. However, if while the water level in the raceway 13 is such as to cause the gate 11 to be half closed, the water level in the pond 17 should fall below the half-way mark between the limits, i. e. below the 480 ft. mark, the movable contact member 30c would be rotated in the clockwise direction to a point between the pairs of stationary contacts 30a and 30b and any further fall in the water level of the pond will cause the movable contact member 30c to bridge the stationary contact 30b and complete an energizing circuit for the lowering contactor. As a result of this, the motor 14 would again be energized and would lower the gate 11 by an amount proportional to the fall of the water level in the pond. Consequently, if the water level in the pond should fall beyond the lower limit, i. e. elevation 482.75 ft., the gate 11 would be entirely closed. Thus, it will be seen that although neither the float devices 17 or 21 can open the gate 11 beyond the maximum opening determined by the other float device, either of these devices can operate to close the gate entirely or to open it through the maximum amount determined by the other device and of course can operate to regulate the gate to any intermediate position between the fully closed position and the opening determined by the water level of the pond or raceway calling for the smaller opening.

At the upper and lower limits of travel of the gate 11, the limit switches 34 and 32 are opened and interrupt the energizing circuit for the raising and lowering contactors 29, 28, respectively. This prevents any operation of the gate beyond the predetermined limit and thus avoids any jamming of the mechanism or damage due to improper operation beyond the limits.

From the foregoing, it will be clear that if the water level in the pond 12 is above the upper elevation of 483.25 ft. and the water level in the raceway 13 is lower than the lower limit of 480, the gate will be wide open. Similarly if the water level in the pond is lower than elevation 482.75 ft. or the water level in the raceway 13 is above elevation 481 ft., the gate 11 will be fully closed. For other levels of the pond and the raceway, the gate will occupy intermediate positions corresponding to the water level of the body calling for the smaller gate opening.

Although in accordance with the provisions of the patent statutes, this invention is described as embodied in concrete form, it will be understood that the elements and apparatus shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is:

1. A system for controlling the levels of fluid bodies comprising valve means for controlling the communication between said bodies, means responsive to level of one of said bodies for controlling the opening of said valve, means responsive to the level of the other of said bodies for controlling the opening of said valve, and interlocking means controlled by both said level responsive means for limiting the operation of said valve by one of said level responsive means to limits determined by the other of said level responsive means.

2. A system for controlling the levels of fluid bodies comprising valve means for controlling the communication between said bodies, means responsive to the level of one of said bodies for controlling the opening of said valve, means responsive to the level of another of said bodies for regulating the opening of said valve within limits established by said first level responsive means, and interlocking means controlled by both said level responsive means for limiting the operation of said valve by said second level responsive means to the limit determined by said first level responsive means.

3. A system for controlling the levels of communicating fluid bodies comprising valve means for controlling the communication between said bodies, means responsive to the level of one of said bodies for controlling the opening of said valve means proportionally to the level of said body, means responsive to the level of another of said bodies for controlling the opening of said valve in proportion to the level of another of said bodies, and interlocking means controlled by said level responsive means for limiting the opening of said valve by either of said level responsive means to the limit determined by the other of said level responsive means.

4. A control system for a gate valve controlling the levels of two communicating fluid bodies comprising an electric motor for opening and closing the gate, a follow-up system actuated by the level of one of said bodies for controlling said motor to open said gate an amount proportional to level of said body, a follow-up system actuated by the level of the other of said bodies for controlling said motor to open said gate an amount proportional to the level of said other body, and interlocking electrical control circuits controlled by both of said follow-up systems for preventing each of said follow-up systems from opening the gate a greater amount than that determined by the other of said systems.

5. A control system for gate valves and the like controlling the levels of two communicating fluid bodies comprising driving means for opening and closing the gate, means for controlling said driving means to open said gate an amount proportional to the level of one of said bodies comprising a pair of floats each responsive to the level of one of said bodies, a pair of electrical motion transmitting devices, each actuated by one of said floats, an electrical transmission device actuated by said driving means, a pair of differential motion receiving devices, one connected between each of said float actuated transmitting devices and said driving means actuated device, switching means actuated by each of said differential devices, and interlocking connections controlled by said differential devices for preventing each of said floats from opening said gate more than the amount determined by the other of said floats.

6. A control system for controlling a head gate between the bodies of water on opposite sides of a dam comprising an electric motor for opening and closing the gate, a follow-up system for opening the gate an amount proportional to the level on the up-stream side of said dam comprising a device controlled by the water level on said upstream side and an electrical motion transmitting device actuated thereby, a motion transmitting device actuated by said motor, an electrical differential motion receiving device connected to both said transmitting devices and switching means controlled by said differential device, a second follow-up system for opening the gate an amount proportional to the down-stream water level comprising a device controlled by the downstream water level and an electrical transmission device actuated thereby, an electrical differential motion receiving device connected to said up-stream differential device and to said downstream transmitting device and said motor actuated transmitting device and switching means controlled by said second-mentioned differential device, and interlocking electrical control circuits controlled by said differential devices for limiting the gate opening to the smaller of the openings determined by said water levels.

ALFRED SUKSDORF.